Figure 1:
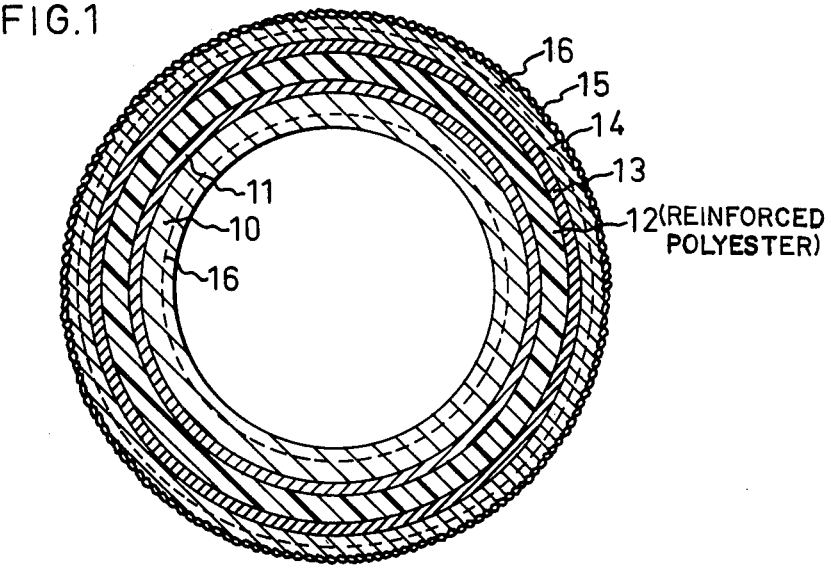

United States Patent [19]

Ekström

[11] 4,289,172
[45] Sep. 15, 1981

[54] REINFORCED BITUMEN PIPES AND PROCESS FOR THEIR MANUFACTURE

[76] Inventor: Stig O. M. Ekström, Kungsgatan 28, S-211 49 Malmö, Sweden

[21] Appl. No.: 34,884

[22] Filed: May 1, 1979

[30] Foreign Application Priority Data

May 31, 1978 [SE] Sweden .............................. 7806324

[51] Int. Cl.³ .............................................. F16L 9/14
[52] U.S. Cl. ................................... 138/149; 138/137; 138/140; 138/141; 138/145; 138/DIG. 2; 427/240
[58] Field of Search ............... 138/137, 140, 141, 145, 138/146, 149, DIG. 2, DIG. 7, 125; 156/184, 190, 192, 279; 427/240

[56] References Cited

U.S. PATENT DOCUMENTS

| | | | |
|---|---|---|---|
| 2,047,778 | 7/1936 | Hayden | 138/149 X |
| 2,545,030 | 3/1951 | Isenberg et al. | 138/149 X |
| 2,546,533 | 3/1951 | Williamson | 138/149 X |
| 2,653,887 | 9/1953 | Slayter | 138/145 |
| 2,872,947 | 2/1959 | Isenberg | 138/149 X |
| 2,919,721 | 1/1960 | Isenberg | 138/149 X |
| 3,039,495 | 6/1962 | Drukker | 138/145 |
| 3,288,171 | 11/1966 | Hucks | 138/145 |
| 4,081,302 | 3/1978 | Drostholm | 138/149 X |

Primary Examiner—James E. Bryant, III
Attorney, Agent, or Firm—Beveridge, DeGrandi, Kline & Lunsford

[57] ABSTRACT

A reinforced bitumen pipe has an inner, strength-providing, reinforced thermosetting resin layer which is coated on its inner and outer sides with a bitumen layer. The bitumen layer on the inner side, and preferably also the bitumen layer on the outer side, is separated from the strength-providing reinforced thermosetting resin layer with the aid of an insulating glass fiber layer into which the thermosetting resin and the bitumen partially penetrate without finding their way up to each other.

12 Claims, 2 Drawing Figures

REINFORCED BITUMEN PIPES AND PROCESS FOR THEIR MANUFACTURE

The reinforced bitumen pipe is manufactured by first producing a cured thermosetting resin layer with inner and outer insulating glass fiber layers only partially penetrating into the cured resin layer, whereupon this semi-finished product after some aging is coated with bitumen layers internally and externally, said bitumen layers being caused to partially penetrate into the adjoining insulating glass fiber layer. In a modification of this process the inner bitumen layer is first applied to a mandrel which has been coated with release agent and then the insulating glass fiber layer is wound under tension onto the still hot and plastic inner bitumen layer so that the bitumen partially penetrates into the glass fiber layer. The thermosetting resin layer is then successively built up on the outer side of the glass fiber layer. After curing of the thermosetting resin layer the outer bitumen layer is applied to the thermosetting resin layer.

When laying for example sewer pipes in the ground use has been made of pipes of sundry materials such as PVC, polyethylene, asbestos cement, cast iron. Such pipes are usually relatively expensive even though the plastic pipes can be manufactured at relatively competitive prices. However, the plastic pipes suffer from the drawback that they may be subject to cracking and acquire porosity so that such pipes, especially polyester pipes, may be dissolved by soil acids etc.

The present invention has for its object to provide a relatively inexpensive pipe which possesses the favourable properties of the plastic pipes but is devoid of the disadvantages inherent in these pipes as well as other prior art pipes.

To this end, the invention provides a reinforced bitumen pipe which is characterized in that it has an insulating glass fiber layer which at its inner side is united with an inner bitumen layer partially penetrating into the glass fiber layer, and at its outer side is united with a strength-providing layer of reinforced thermosetting resin which partially penetrates into the glass fiber layer without reaching the bitumen layer, said strength-providing layer being coated on its outer side with an outer bitumen layer which is preferably separated from the strength-providing layer by means of a glass fiber layer into which the strength-providing layer and the outer bitumen layer partially penetrate from opposite sides without reaching one another, and the outer bitumen layer optionally has an outer coating of particulate material attached to its surface.

In this pipe the glass fiber layer or the two glass fiber layers are preferably formed by dense woven fabric of glass fiber rovings. The strength-providing layer may consist of a reinforced polyester. The inner and/or the outer bitumen layer is preferably reinforced with a glass fiber layer entirely impregnated with bitumen and preferably consisting of a diamond fabric (i.e. an open woven glass fiber fabric).

The invention also relates to a process of manufacturing such a reinforced bitumen pipe, in which the pipe is successively built up on a mandrel which has been coated with a release layer. Characteristic of this process is that warm bitumen composition is spread onto the mandrel having the release layer to form an inner bitumen layer onto which a glass fiber layer is applied and which is thus caused to partially penetrate into the glass fiber layer without finding its way all through said layer, and that a reinforced layer of thermosetting resin is successively built up on the outer side of said glass fiber layer and is thereby caused to partially penetrate thereinto without reaching the bitumen layer, after which the layer of thermosetting resin is cured and coated after curing with an outer bitumen layer which on its outer side is preferably coated with a particulate material. It is preferred in this process, when building up the reinforced layer of thermosetting resin on the outer side of the glass fiber layer, first to apply a gel-coat layer, on the outer side of which the layer of thermosetting resin is then successively built up by successive application of resin and reinforcing layers to the necessary strength. The resin is cured. The outer bitumen layer is preferably applied only after a given postcuring time has passed in order that the major part of the substances which have not participated in the curing reaction shall have escaped before the application of the outer bitumen layer. Preferably, the outer bitumen layer is caused to enclose also the annular end surfaces of the pipe so that the glass fiber layer and the layers of thermosetting resin are entirely enclosed by bitumen.

In a further development of this process it has been found to be more advantageous first to manufacture the strength-providing reinforced layer of thermosetting resin which is thereby united both on its outer and inner sides with glass fiber layers that only partially penetrate into the layer of thermosetting resin, after which the bitumen layers on the inner and outer sides are applied. The present invention thus also provides another process of manufacturing the reinforced bitumen pipe concerned, and in this process a mandrel is coated with a glass fiber layer on the outer side of which a reinforced layer of thermosetting resin is then successively built up and thereby caused to partially penetrate into the glass fiber layer without finding its way all through said layer, whereupon a further glass fiber layer is optionally caused to partially penetrate into the outer side of the thus produced layer of thermosetting resin, after which the layer of thermosetting resin is cured and coated after curing with outer and inner bitumen layers which are caused to partially penetrate into the glass fiber layer and of which the outer bitumen layer on its outer side is preferably coated with a particulate material, while the inner side of the inner bitumen layer is preferably postheated for reduction of its porosity.

The application of the inner bitumen layer in said last-mentioned process preferably takes place by centrifugal casting of molten bitumen against the inner side of the tubular strength-providing layer of thermosetting resin. Such an application method brings about a very strong anchorage of the bitumen layer. The application of the outer bitumen layer can be realized by slowly rotating the pipe in a pot of molten bitumen, but the application can also be made by spreading the outer bitumen layer with a doctor blade. Same as in the above described first process according to the invention the bitumen layer may on both the inner and outer sides of the pipe be reinforced to great advantage with a glass fiber layer, preferably diamond or openly woven fabric, entirely impregnated with bitumen.

The two bitumen layers or, in the first mentioned case, the outer bitumen layer is preferably applied only after a given postcuring time has passed after the curing of the layer of thermosetting resin in order that the major portion of the substances which have not participated in the curing reaction shall have escaped before the application of the bitumen. The application of the bitumen involves reheating of the layer of thermosetting resin, which results in an improved curing of the layer of thermosetting resin so that the curing reaction is made complete.

The invention is based on the understanding that bitumen is a substance that withstands both humic acids and the liquids which are meant to flow in the pipes. The bitumen itself, however, has insufficient strength to permit being shaped into pipes of the requisite solidity, in particular resistance to compression. Attempts aiming at a direct application of a layer of thermosetting resin onto the outer side of the inner bitumen layer have however failed since the substances making up the still uncured thermosetting resin migrated into the bitumen and modified the properties thereof, resulting in a poor adhesion of the layer of thermosetting resin. Therefore, according to the invention, use is made of a relatively thick glass fiber layer as an "insulating" and binding layer between at least the inner bitumen layer and the layer of thermosetting resin outside it. Although the same problems are not associated with the application of the bitumen to the outer side, since the application of the outer bitumen layer can be carried out after a time sufficient to permit the major portion of the non-reacted components of the thermosetting resin starting materials to escape, it nevertheless is most advantageous to utilize a thick glass fiber layer as an "insulating" and binding layer also between the layer of thermosetting resin and the outer bitumen layer. After the layer of thermosetting resin has been coated with bitumen layers and particulate material has optionally been attached to the outer side of the outer bitumen layer there is a obtained a reinforced bitumen pipe which presents all the advantages of the bitumen along with the strength of the thermosetting resin.

As particulate materials for attaching to the outer side of the outer bitumen layer use can be made of crushed stone material, talcum or the like.

Figure 2:
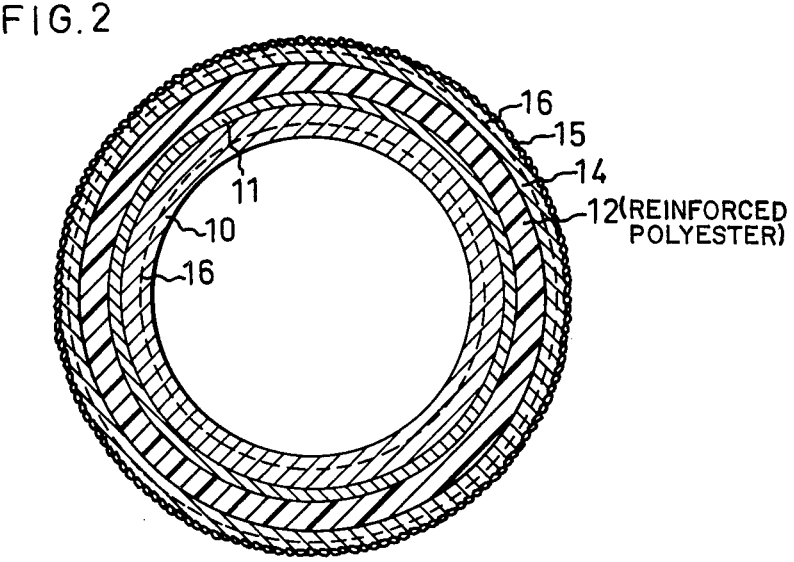

The invention will be described in greater detail hereinbelow with reference to the accompanying drawing in which:

FIGS. 1 and 2 are cross-sections of two embodiments of the bitumen pipe according to the invention.

In an embodiment of the invention a pipe was manufactured in conformity with FIG. 1. This pipe has an inner bitumen layer 10, an insulating glass fiber layer 11, a glass fiber reinforced layer of thermosetting resin 12, a further insulating glass fiber layer 13, an outer bitumen layer 14 and a sand coat 15. As illustrated, the inner and outer bitumen layers may have a reinforcement 16 which is described in the following. At the manufacture of this pipe use was made of a mandrel having a diameter of 20 cm. The mandrel was first covered with a fabric layer of woven glass fiber rovings which was helically coiled onto the mandrel to constitute the layer 11. The glass fiber roving fabric was densely woven and had a thickness of 0.7–0.8 mm. Then a layer of polyester-based, styrene-containing gel-coat was applied. The gel-coat was creamy and of such a viscosity that it could not penetrate through the glass fiber fabric. As gel coat use can be made of LAMELLON 2670 which is a low-viscous slightly thixotropic polyester which in liquid state has a viscosity of 3–4 P at 20° C. and which can be composed in such a way that it will have a gelling time of 5–7 minutes and a curing time of 10–20 minutes. On the outer side of the gel-coat layer a laminate of polyester layers and glass fiber layers was successively built up until the requisite number of glass fiber layers and the requisite strength had been obtained. As final glass fiber layer, helically coiled web of fabric woven from glass fiber roving was applied. Said fabric web was caused to only partially penetrate into the still uncured polyester layer. The gel-coat layer and the glass fiber reinforced polyester layer together formed the layer 12 of thermosetting resin. The helically coiled web of fabric woven from glass fiber roving formed the layer 13. After that the laminate was cured and after curing it was left lying for some days so that the styrene in the resin could escape. Then the semi-finished pipe was withdrawn from the mandrel and passed into a coating machine for coating with bitumen. In the coating machine a bitumen layer was spread with a doctor blade on the outer side of the pipe. This bitumen layer formed the layer 14 and was applied in a thickness of 2–3 mm. As bitumen use was made of a mixture of two asphalt types, viz. 70% NYNÄS 9330 (KoR melting point 93° C., penetration 30 mm/10 at 25° C.) and 30% gilsonit, the asphalt or bitumen mixture having a KoR melting point of 105°–110° C. and a penetration of 11–30 mm/10 at 25° C. At the application the asphalt or bitumen mixture had a temperature of 180° C. The asphalt or bitumen mixture was also caused to cover the end surfaces of the layer of thermosetting resin.

The inner bitumen layer 10 was then applied by centrifugal casting of the hot asphalt or bitumen mixture which on this occasion had a temperature of 170° C. In the centrifugal casting operation the pipe was rotated at a peripheral speed of 6 m/min, and the rotation continued for 5 minutes after the molten bitumen layer had been applied. The bitumen was thereby caused to heavily penetrate into the woven glass fiber rovings adhering to the inner side of the thermosetting resin layer, whereby a strong bond was obtained between the inner bitumen layer and the thermosetting resin layer.

After the bitumen layers had cooled the inner bitumen layer was heat-treated with the aid of gas flames to partially melt the surface of the bitumen layer and ensure that the surface was entirely free of pores.

In another embodiment of the invention the pipe was manufactured in conformity with FIG. 2. This pipe was built up in the same way as the pipe in FIG. 1, except that the layer 13 was lacking. The same reference numerals have therefore been utilized. In the manufacturing operation use was made of a mandrel having a diameter of 20 cm. The mandrel was first covered with a release layer which could withstand heat up to about 230° C. and which was formed by a polyester film or nylon film having a thickness of 0.10 mm. A bitumen layer 10 having a thickness of 2–3 mm was then applied to the outer side of the release layer. Said bitumen layer was formed by the above-mentioned mixture of 70% NYNÄS 9330 and 30% gilsonit. At the application the asphalt or bitumen mixture had a temperature of 180° C. With the inner bitumen layer in a soft state (i.e. molten to semi-molten state) a layer of fabric 11 woven from glass fiber roving was applied and drawn in by about 30% into the bitumen layer. The glass fiber roving fabric was densely woven and had a thickness of 0.7–0.8 mm so that the viscous, molten to semi-molten bitumen could not penetrate the glass fiber fabric. The bitumen was then allowed to set (cool for about 5 minutes) to a temperature of below 100° C. A layer of polyester-based, styrene-containing gel-coat, the above-mentioned product LAMELLON 2670, was applied and on the outer side of the gel-coat layer there was successively built up a laminate of polyester layers and glass fiber layers until the requisite number of glass fiber layers and the requisite strength had been obtained. The gel-coat layer and the polyester and glass fiber layers applied to the outer side thereof together formed the layer 12. After that the laminate was cured and left lying for some days after cooling so that the styrene in the resin could escape. The semi-finished pipe was then withdrawn from the mandrel, the release layer being also removed. The outer side of the semi-finished pipe was coated with a new batch of bitumen to form a layer 14 having a thickness of 2–3 mm and enclosing also the annular end surfaces of the pipe.

In the two embodiments of the invention the outer side of the outer bitumen layer can be coated to advantage with talcum, sand or other material 15 to faciliate handling of the pipe.

The inner as well as the outer bitumen layer 10 and 14, respectively, can in both embodiments optionally be reinforced with a glass fiber fabric of its own, which is entirely impregnated with the bitumen and can be formed by a diamond or openly woven fabric 16 having a weight of 200 g/m². The glass fiber fabric placed between the thermosetting resin layer and the inner and outer bitumen layers, respectively, and which is preferably made up of densely woven glass fiber roving, preferably has a weight of 780 g/m², which corresponds to a thickness of about 1.2 mm.

The reinforcing layers in the thermosetting resin layer preferably are at least three in number, in both embodiments, and the thermosetting resin layer is dimensioned according to the intended pressure class of the pipes. A pipe having a dimension of 500 mm for 10 kg operating pressure should thus have for instance 6–7 reinforcing layers in the thermosetting resin layer. As reinforcing layers in the thermosetting resin it is advantageous to use glass fiber fabric which has been formed from glass roving and which have a tensile strength of about 325 kg/cm. The fabric can have a weight of 780 g/m² and can be wound as a bandage, i.e. helically along the pipe. The same application method can be utilized for the application of the glass fiber layers serving as separating and binding layers between the bitumen and thermo setting resin layers. Coiling may be performed under a certain pull in order that the glass fiber layer be flattened and caused to partially penetrate into the substrate.

The reinforced bitumen pipe according to the invention can be in the form of socket pipes or smooth pipes, but can also be formed as bends, T-pipes and pipes of many other shapes. In these cases use must of course be made of mandrels of corresponding shapes.

What I claim and desire to secure by Letters Patent is:

1. A reinforced bitumen pipe, characterized in that it has an insulating glass fiber layer which on its inner side is united with an inner bitumen layer partially penetrating into the glass fiber layer and which on its outer side is united with a strength-providing layer of reinforced thermosetting resin partially penetrating into the glass fiber layer without reaching the bitumen layer, said strength-providing layer being coated on its outer side with an outer bitumen layer.

2. A pipe as claimed in claim 1, characterized in that said insulating glass fiber layer comprises densely woven glass fiber roving.

3. A pipe as claimed in claim 1, characterized in that the strength providing layer comprises reinforced polyester.

4. A pipe as claimed in any one of claims 1 to 3 in which said outer bitumen layer has an outer coat of particulate material attached to its surface.

5. A pipe as claimed in claim 4 characterized in that both of said bitumen layers are reinforced with a glass fiber layer entirely impregnated with bitumen.

6. A pipe as claimed in claim 4 characterized in that one of said bitumen layers is reinforced with a glass fiber layer entirely impregnated with bitumen.

7. A reinforced bitumen pipe, comprising an insulating glass fiber layer which on its inner side is united with an inner bitumen layer partially penetrating into the glass fiber layer and which on its outer side is united with a strength-providing layer of reinforced thermosetting resin partially penetrating into the glass fiber layer without reaching the bitumen layer, said strength-providing layer being coated on its outer side with an outer bitumen layer which is separated from the strength-providing layer by means of a glass fiber layer in which the strength-providing layer and the outer bitumen layer partially penetrate from opposite sides without reaching one another.

8. A pipe as claimed in claim 7, characterized in that one of said insulating glass fiber layers comprises densely woven glass fiber roving.

9. A pipe as claimed in claim 7, characterized in that the strength providing layer comprises reinforced polyester.

10. A pipe as claimed in any one of claims 7 to 9 in which said outer bitumen layer has an outer coat of particulate material attached to its surface.

11. A pipe as claimed in claim 10, characterized in that one of said bitumen layers is reinforced with a glass fiber layer entirely impregnated with bitumen.

12. A pipe as claimed in claim 10 characterized in that both of said bitumen layers are reinforced with a glass fiber layer entirely impregnated with bitumen.

* * * * *